United States Patent [19]
David et al.

[11] Patent Number: 5,733,080
[45] Date of Patent: Mar. 31, 1998

[54] PROCESS FOR MILLING A TURBINE-BLADE PROFILE EXTENDING ALONG A MAIN AXIS

[75] Inventors: Rolf David; Berthold Kinzel, both of Mülheim an der Ruhr, Germany

[73] Assignee: Siemens Aktiengesellschaft, Munich, Germany

[21] Appl. No.: 625,633

[22] Filed: Mar. 29, 1996

Related U.S. Application Data

[63] Continuation of PCT/EP94/03112 Sep. 16, 1994.

[30] Foreign Application Priority Data

Sep. 29, 1993 [EP] European Pat. Off. ............ 93115743

[51] Int. Cl.⁶ .................................................... B23C 1/30
[52] U.S. Cl. ...................... 409/132; 29/889.23; 409/199
[58] Field of Search .................................. 409/132, 199, 409/84; 29/889, 889.23, 889.6, 889.7

[56] References Cited

U.S. PATENT DOCUMENTS

| | | | |
|---|---|---|---|
| 2,633,776 | 4/1953 | Schenk | 409/132 |
| 2,726,578 | 12/1955 | Creek | 409/84 |
| 3,910,159 | 10/1975 | Gladwin | 409/199 |
| 4,031,809 | 6/1977 | Shraiman et al. | 409/84 |
| 4,061,077 | 12/1977 | Gladwin | 409/199 |
| 5,125,775 | 6/1992 | Breuer et al. | 409/132 |

FOREIGN PATENT DOCUMENTS

| | | | |
|---|---|---|---|
| 963320 | 7/1950 | France. | |
| 649302 | 8/1937 | Germany | 29/889.7 |
| 2 352 539 | 5/1974 | Germany. | |
| 25 44 612 | 4/1976 | Germany. | |
| 4-343609 | 11/1992 | Japan | 409/199 |
| 79554 | 4/1919 | Switzerland | 29/889.7 |
| 661 678 A5 | 8/1978 | Switzerland. | |
| 661678 A5 | 8/1987 | Switzerland | 409/132 |
| 625771 | 7/1949 | United Kingdom. | |
| 635775 | 4/1950 | United Kingdom. | |
| 703796 | 2/1954 | United Kingdom. | |
| 1 493 236 | 11/1977 | United Kingdom. | |

OTHER PUBLICATIONS

"Markrogeometrische Formabweichung beim Stirnnrehfräsen mit Längsvorschub", D 82 (Diss. T.H. Aachen), 1984.
"Handbuch der Fertigungstechnik", Carl Hanser Verlag München Wien, 1979.
Technische Information TI ALG-039, 1989.

*Primary Examiner*—A. L. Pitts
*Assistant Examiner*—Christopher Kirkman
*Attorney, Agent, or Firm*—Herbert L. Lerner; Laurence A. Greenberg

[57] ABSTRACT

The invention relates to a process for milling a turbine-blade profile which extends along a main axis from a workpiece. The turbine blade has a convex suction side and a concave pressure side. The suction side is milled with a milling cutter which rotates about an associated axis of rotation and which has an circular and flat endface defined by a rotating configuration with at least one cutting edge. The milling cutter and the workpiece are moved relative to one another approximately perpendicularly to the main axis. The cutting edge of the milling cutter is located in the endface, and the endface is oriented tangentially to the suction side surface to be milled. The pressure side is milled by with a rotating milling cutter whose rotary axis intersects a plane perpendicular to the main axis at an acute angle.

18 Claims, 5 Drawing Sheets

PROCESS FOR MILLING A TURBINE-BLADE PROFILE EXTENDING ALONG A MAIN AXIS

CROSS-REFERENCE TO RELATED APPLICATIONS

This is a continuation of our international application PCT/EP94/03112, filed Sep. 16, 1994, and designating the United States.

BACKGROUND OF THE INVENTION

1. Field of the Invention

The invention relates to a process for milling a turbine-blade profile, prolate along a main axis and having a convex suction side and a concave pressure side, from a workpiece, whereby the suction side is milled with a milling tool which rotates about a corresponding axis, which milling tool has a circular, flat face surface defined by a rotating device with at least one cutting edge, wherein the cutting tool and the workpiece are moved relative to one another approximately perpendicularly to the main axis.

The invention also relates to a process for milling a turbine-blade profile, prolate along a main axis and having a convex suction side and a concave pressure side, from a workpiece, whereby the pressure side is milled by means of a milling tool which rotates about a corresponding axis.

Processes of this general kind have been known heretofore from German patent publications DE 25 44 612 A1 and DE 25 44 612 C3.

The invention therefore relates especially to the milling of turbine-blade profiles for so-called drum blades having turbine-blade profiles which are invariable along a main axis and, moreover, are not skewed and which are often used in steam turbines. Apart from the actual turbine-blade profiles, such drum blades conventionally have root parts, to which they are to be fastened, and head parts which perform particular sealing functions and damping functions. Drum blades are known in many versions. Drum blades are often produced by milling from workpieces of simple shape, so-called blanks. A blank has a simple shape and, for example, is sawn out of a large ingot. It is usually a prism which is straight along the main axis of the drum blade to be produced and which, perpendicularly to the main axis, has a rectangular or parallelogram-shaped cross-section.

Generalized background information with regard to the turbine-blade profile for a drum blade, which is straight, i.e., non-skewed, along an axis, may be found in British patent specifications 625,771; 635,775; and 703,796. A generalized turbine-blade profile specified in those publications is characterized in that it is determined by a set of straight lines which in their entirety form the surface corresponding to the turbine-blade profile. A turbine-blade profile which is straight along an axis, such as occurs in a drum blade, is a simple example of a generalized turbine-blade profile of this type, the straight lines which form the straight turbine-blade profile all being parallel to the axis. In addition, however, there are also more complicated profiles, especially profiles with cross-sections which lie in planes perpendicular to the axis and which vary linearly along the axis, and also skewed profiles.

The generation of such skewed profiles emerges from the following simple model: a non-skewed profile which is straight or which varies linearly along an axis may be represented by a bundle of rods, such as are used in well-known Chinese game "pick-up sticks". The bundle, which is put down on a base on a first side and which is pressed onto the base on a second side by the surface of the modelling person's hand, can be deformed and rotated in many ways by rotating and/or displacing the surface of the hand, without individual rods being bent. The rods as a whole still always form a unitary surface which, with a sufficiently large number of rods, appears closed. Each of the surfaces which can be generated in this way is an example of a surface which consists of a set of straight lines or, as expressed in the above-mentioned documents, coincident lines. It should be noted that virtually any turbine-blade profile can be approximated locally, that is to say within sufficiently close proximity to each point, to a surface which consists of a set of straight lines and which is, in particular, plane. As regards turbine-blade profiles or parts of turbine-blade profiles which are each formed from a set of straight lines and which are prolate along an axis, it can be stated, in general terms, that, in each case, the lines are oriented at an acute angle relative to the axis. One important reason for this lies in the manner in which such turbine-blade profiles are generated from straight turbine-blade profiles and also in the fact that the turbine-blade profiles must always be curved more markedly in cross-sections approximately perpendicular to the axis than in longitudinal sections parallel to the axis.

We return once more to the above-mentioned German publication DE 25 44 612 C3. According to that teaching, the turbine-blade profile is milled in that a milling cutter is guided circularly or helically around the workpiece about the main axis and the blade is formed with an endface which is defined by a rotating arrangement of cutting edges which, at each point of the surface of the turbine-blade profile to be produced, respectively forms an acute angle with a plane tangential relative to the turbine-blade profile. At the same time, the pressure side and the suction side are produced by means of a single milling cutter. The spatial orientation of the milling cutter in relation to the turbine-blade profile to be produced results, on the milled workpiece, in a surface which has a grooved structure and which therefore requires complicated machining in order to obtain the turbine-blade profile. Consequently, the specified advantage of the process, in which only a single milling cutter is to be necessary to produce a turbine-blade profile, rather becomes a liability, since at least a further shaping, chip-removing machining of the milled workpiece is required.

A general survey of the known milling processes and of machine tools suitable for this purpose, admittedly without any reference to milling of turbine blade profiles along with the special problems critical in this case, emerges from the "Handbuch der Fertigungstechnik" ["Manual of Production Engineering"], issued by G. Spur and T. Stoeferle, Carl Hanser Verlag, Munich and Vienna, 1979, volume 3/1, chapter 7. Section 7.2.1, page 437, together with pictorial representations on page 438, shows a process for milling a circular cylindrical surface, by means of which the desired surface is obtained directly, particularly without a macroscopic grooved structure. The chapter mentioned also contains overviews of the basic construction of a milling cutter, see, in this respect, especially section 7.6, page 463 ff., and references to the basic construction of milling machines.

SUMMARY OF THE INVENTION

It is accordingly an object of the invention to provide a process for milling a turbine-blade profile which is prolate along a main axis, which overcomes the above-mentioned disadvantages of the heretofore-known devices and methods of this general type and which processes provide at least the pressure side or the suction side of the turbine blade with a surface which does not require further structural shaping machining.

With the foregoing and other objects in view, there is provided, in accordance with the invention, a process for milling a turbine-blade profile from a workpiece, the turbine-blade profile extending along a main axis and having a convex suction side surface and a concave pressure side surface. The novel process comprises the following steps:

providing a milling cutter having a planar, circular endface defined by a rotating configuration with at least one cutting edge disposed in the endface;

milling the suction side with the milling cutter rotating about a given axis of rotation;

moving the milling cutter and the workpiece relative to one another during the milling step substantially perpendicularly to the main axis; and orienting the endface tangentially to the suction side surface to be milled during the moving step and contacting the suction side surface with the milling cutter at a contact line enclosing a given angle with the main axis.

Preferably, the given angle is an acute angle, or it is zero.

In other words, the object of the invention with regard to the suction side is satisfied with a process for milling a turbine-blade profile, prolate along a main axis and having a convex suction side and a concave pressure side, from a workpiece, the suction side being milled by means of an associated milling cutter rotating about an associated axis of rotation, which milling cutter has an annular plane endface which is defined by a rotating configuration with at least one cutting edge, the milling cutter and the workpiece being moved relative to one another approximately perpendicularly to the main axis, and the cutting edge being located in the endface and the endface being oriented tangentially to the suction side to be milled and touching the suction side at a contact line oriented at a given angle to the main axis. The given angle may be an acute angle, or it may be zero.

Accordingly, as a departure from the process taught in the abovementioned patent specification, the milling cutter having a cutting edge located in the endface is oriented in such a way that its endface, on the contact line, is oriented approximately tangentially to the suction side. The milling therefore no longer takes place predominantly with the endface, but with side faces of the milling cutter. This ensures, however, that the milling track which the milling cutter forms on the workpiece has a region which is, in fact, smooth. This therefore prevents a grooved structure from occurring, unavoidable in the previous processes, and the desired surface on the suction side is obtained essentially directly. Remachinings, insofar as they are necessary at all, can be restricted to measures for smoothing the surface by grinding or lapping. Shaping remachinings are no longer absolutely necessary.

The orientation according to the invention of the milling cutter means that the contact line on which the milling cutter touches the suction side corresponds to a straight line from the set which approximates the desired turbine-blade profile in the region of the point at which the milling cutter touches it. This approximation is perfect when the turbine-blade profile to be produced is in actual fact formed from a set of straight lines; it still always remains particularly advantageous when this is not the case and the approximation is therefore only imperfect, since the deviations from the predetermined shape of the turbine-blade profile which the process then causes are kept particularly small.

To achieve an especially wide smooth region in the milling track generated by the milling cutter on the workpiece, it is advantageous to position the milling cutter in such a way that the contact line is a chord lying completely within the endface and connecting two points of an outer edge of the endface to one another. The smooth region of the milling track which is defined by this contact line thereby becomes especially large. It is particularly advantageous if the contact line runs approximately tangentially to an inner edge of the endface, that is to say if it virtually reaches the inner edge of the endface. The outer edge of the endface is determined by the ends of the cutting edges facing away from the axis of rotation of the milling cutter: the inner edge of the endface is obtained from the ends of the cutting edges facing the axis of rotation. The manner in which the milling cutter is arranged in order to mill the suction side accordingly depends essentially on the geometry of the milling cutter used. The number of cutting edges which the milling cutter has on the endface is of no essential importance: the choice of the milling cutter can be made in the light of the foregoing remarks within the scope of the judgement of a person skilled in the art.

Many turbine-blade profiles possess between the suction side proper and the pressure side proper transitional zones, especially in the front and in the rear region, which are themselves convex. Advantageously, these transitional zones are milled together with the suction side, within the scope of the above-described process.

The process for producing a turbine-blade profile is especially advantageous if the suction side is formed from a set of straight lines, each of which is oriented at an acute angle or parallel to the main axis, and if the contact line always lies on one of these straight lines. During the milling of the turbine-blade profile, the endface of the milling cutter on the contact line must correspond as closely as possible to the turbine-blade profile; in a turbine-blade profile formed from a set of straight lines, this is achieved in an especially advantageous way in that the contact line always lies on one of these straight lines. Since the turbine-blade profile is convex on the suction side to be produced, this means that the endface is satisfactorily oriented tangentially to the suction side to be produced. The persistence of appreciable projections is consequently kept particularly low.

The process for producing the suction side of a drum blade, in which all the straight lines are oriented parallel to the main axis, is especially suitable. In this, in particular, projections are avoided completely, and any remachining also needs to be aimed merely at reducing the surface roughness.

With the above and other objects in view there is also provided, in accordance with the invention, a process for milling a turbine-blade profile which deals primarily with the formation of the concave pressure side surface. The process is defined with the following steps:

milling the pressure side surface with a milling cutter rotating about an axis of rotation, whereby the axis of rotation intersects a plane defined perpendicularly to the main axis at an acute angle; and moving the workpiece and the milling cutter relative to one another at a given angle relative to the main axis during the milling step.

Preferably, the given angle is an acute angle, or it is zero.

In other words, the object of the invention with regard to the pressure side of the turbine-blade profile is satisfied with a process for milling a turbine-blade profile from a workpiece, the pressure side being milled by means of an associated milling cutter rotating about an associated axis of rotation which intersects a plane perpendicular to the main axis at an acute angle, the workpiece and the milling cutter being moved relative to one another at a given angle to the main axis.

The process for milling the pressure side is based on inclining the axis of rotation of the milling cutter used relative to the turbine-blade profile to be produced, in such a way that a milling track having an elliptic cross-section is generated. The concave pressure side can thus be milled in a very good approximation in all instances, so that, in view of the fact that the persistence of some projections is unavoidable, shaping remachinings are necessary only to a slight extent. A further advantage in relation to known milling processes for the pressure side, especially roller-milling processes, is that it is possible to use a milling cutter which is relatively short along the axis of rotation and which can therefore be clamped and mounted at a short distance from the pressure side to be produced; this results in a relatively rigid arrangement which tends to experience hardly any vibrations and which ensures a high equality of the surface of the pressure side, such as can be achieved within the scope of the process.

The process for milling the pressure side is also especially suitable for combination with the process described further above; for milling the suction side; in particular within the scope of this combination, it is possible to mill the turbine-blade profile completely during a single chucking of the workpiece. Although it is necessary to have a drive for the milling cutter, or the milling cutters if different milling cutters are used for the suction side and pressure side, which is pivotable, this is nevertheless easily possible with conventional milling machines. The provision of a milling machine which allows this nonetheless makes it possible to relinquish a further machine for the shaping machining of a turbine-blade profile milled with appreciable projections and this can be especially advantageous in economic terms.

Advantageously, a milling cutter having a radius which is smaller than a minimum radius of curvature of the pressure side is used for milling the pressure side. Since, for milling the pressure side, the milling cutter is mounted with an inclined axis of rotation, it forms a milling track with an elliptic cross-section which, in particular regions, has larger radii of curvature than the milling cutter. It is thus possible to approximate the shape of the pressure side by means of elliptic milling tracks partially overlapping one another and therefore to keep the projections small.

It is particularly advantageous that the milling cutter generates a milling track on the pressure side which touches the pressure side on a contact line and which, on the contact line, has a radius of curvature which is essentially equal to the radius of curvature of the pressure side on the contact line. In this way, the curves describing the profile or the milling track correspond to one another not only in terms of the location, but also in terms of the first derivation and in terms of the second derivation and especially good approximation to the pressure side to be produced is thus achieved.

Regardless of any other design of the process, the entire pressure side is advantageously milled, in that a plurality of milling tracks which partially overlap one another are generated by means of the milling cutter. Particularly within the scope of the foregoing embodiment, an especially large number of milling tracks is in no way necessary but a number of at most four is sufficient. This applies particularly when the pressure side has an essentially constant radius of curvature, for example is essentially circular-cylindrical.

The process for milling the pressure side is also especially suitable for milling a turbine-blade profile, the pressure side of which is formed from a set of straight lines, each of which is oriented at a given angle to the main axis, the milling cutter always being moved along one of the straight lines. The given angle is in particular an acute angle or zero. The advantage achieved thereby corresponds to the advantage which is achieved during the above-described milling of the suction side of a turbine-blade profile formed from a set of straight lines. In particular, this then shows that the milling track corresponds completely, along the contact line, to the turbine-blade profile to be produced, this being of particular importance for preventing pronounced projections.

The process for milling a pressure side is also used to particular advantage for the milling of a pressure side formed from a set of straight lines, all the straight lines being oriented parallel to the main axis, so that the pressure side is straight along the main axis. The particular advantage of this is that a correspondence of the milling track to the pressure side is afforded not only in that the contact line of each milling track lies on the pressure side to be produced, but also in that the curvature of the milling track along each of these contact lines corresponds to the curvature of the pressure side to be produced. The projections which occur are therefore particularly small, and the process is especially economical, not only in terms of itself alone, but also in respect of the remachining which, of course, is necessary as before.

For the production of a straight turbine-blade profile, it may be added that a simplification occurs both during the milling of the suction side and during the milling of the pressure side, in that there does not have to be pivoting of the workpiece, out of which the turbine-blade profile has to be worked, in relation to the main axis. Only rotations of the milling cutter relative to the workpiece about the main axis are required; relative movements between the workpiece and the milling cutter perpendicular to the main axis need only be translations.

Other features which are considered as characteristic for the invention are set forth in the appended claims.

Although the invention is illustrated and described herein as embodied in a process for milling a turbine-blade profile, prolate along a main axis, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings. It will be noted that the drawing figures are highly diagrammatic and/or deformed for clarity and for the purpose of emphasizing particular features.

DESCRIPTION OF THE PREFERRED EMBODIMENTS

Figure 1:
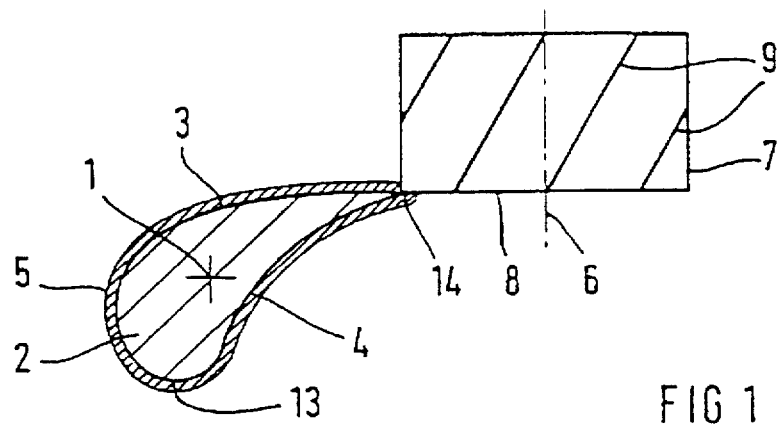
FIG. 1 is a cross-sectional view taken through a blank perpendicular to the main axis, and an milling cutter at ready to mill the suction side.
Figure 2:
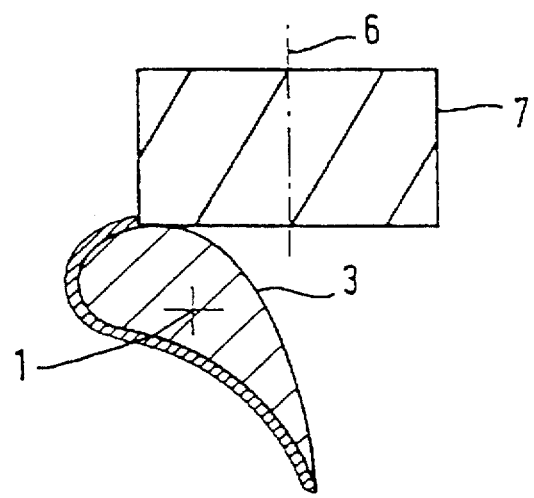
FIGS. 2 and 3 are chronologically sequential views of the the milling operation during the milling of the suction side.
Figure 3:
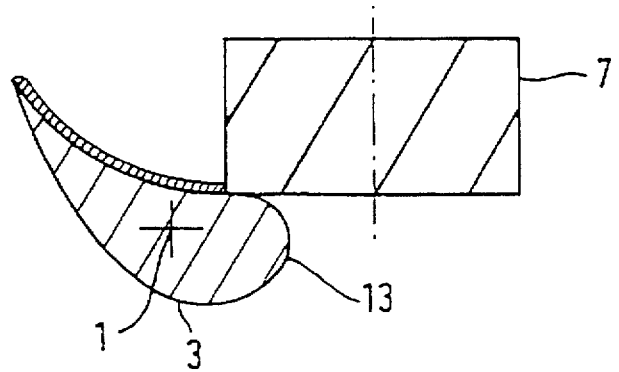

Referring now to the figures of the drawing in detail and first, particularly to FIGS. 1, 2 and 3 thereof, there are shown different stages in the milling of the suction side 3 of a straight turbine-blade profile 2, the turbine-blade profile 2 being rotated about a main axis 1 and being moved relative to a milling cutter 7. The actual turbine-blade profile 2 to be finally produced is surrounded by some projection which, together with the turbine-blade profile 2, forms the workpiece 5. For the sake of simplicity, the projection is represented as a layer of constant thickness; however, its form is at most of minor importance for carrying out the process.

The turbine blade profile 2 has a convex suction side surface 3 and a concave pressure side surface 4 located opposite therefrom. The designation of suction side 3 and pressure side 4 is explained by the fact that, during operation, a pressure gradient forms on the turbine-blade profile 2 between the suction side 3 and the pressure side 4, the higher pressure being on the pressure side 4. Transitional zones 13 and 14 are located between the suction side 3 and pressure side 4, the transitional zone 13 being a blade front part, against which a working medium flows during operation, and the transitional zone 14 being a blade rear part, from which the working medium flows off during operation. These transitional zones 13 and 14 are generally convex and are therefore preferably milled together with a suction side 3. This milling takes place in that a milling cutter 7, selected for milling the suction side 3 and therefore appropriate for this and rotating about an associated axis of rotation 6, is guided over the transitional zones 13 and 14 and the suction side 3. The milling cutter possesses, both on the endface 8 facing the turbine-blade profile 2 and on side faces oriented more or less perpendicularly to the end face 8, cutting edges 9 which strip off material from the workpiece 5 and which thus expose the suction side 3 on the workpiece 5. Particulars as to how the milling cutter 7 is to be applied to the workpiece 5 have already been explained in general terms and will also be repeated in detail with reference to other Figs. According to FIGS. 1 to 3, the milling cutter 7 is applied to the blade rear part 14 and is guided over the suction side 3 to the blade front part 13. In the instance shown, the blade front part 13 has an approximately circular-cylindrical profile and can therefore be milled directly by the milling cutter 7 intended for the suction side 3. The blade front part 13 can be exposed essentially completely as far as the transition to the pressure side 4.

Figure 4:
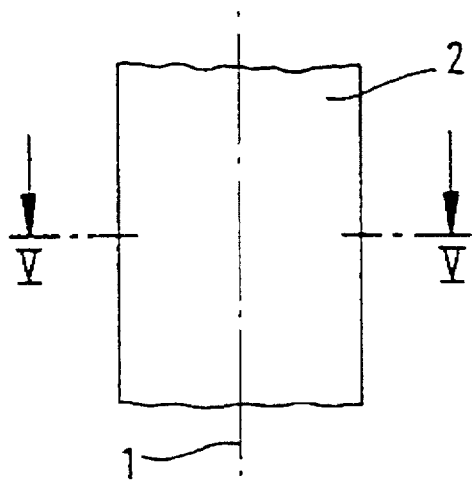
FIG. 4 is a partial view of a finished turbine-blade profile.
Figure 5:
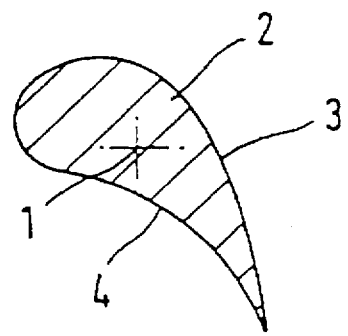
FIG. 5 is a cross-section through the profile taken along the line V—V of FIG. 4.

FIG. 4 shows a view of a finished turbine-blade profile perpendicular to the main axis 1; FIG. 5 shows a cross-section drawn through the blade profile 2 along the line V—V in FIG. 4. The main axis 1 as well as the suction side 3 and the pressure side 4 can be seen clearly.

Figure 6:
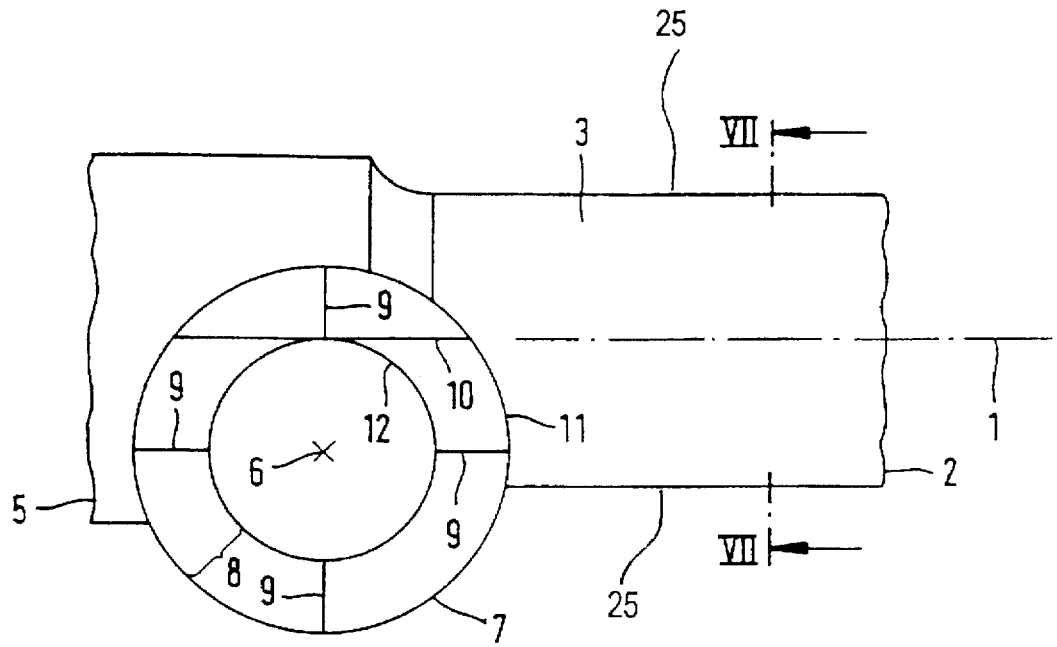
FIG. 6 is a partial, schematic illustrating specific features during the milling of the suction side.
Figure 7:
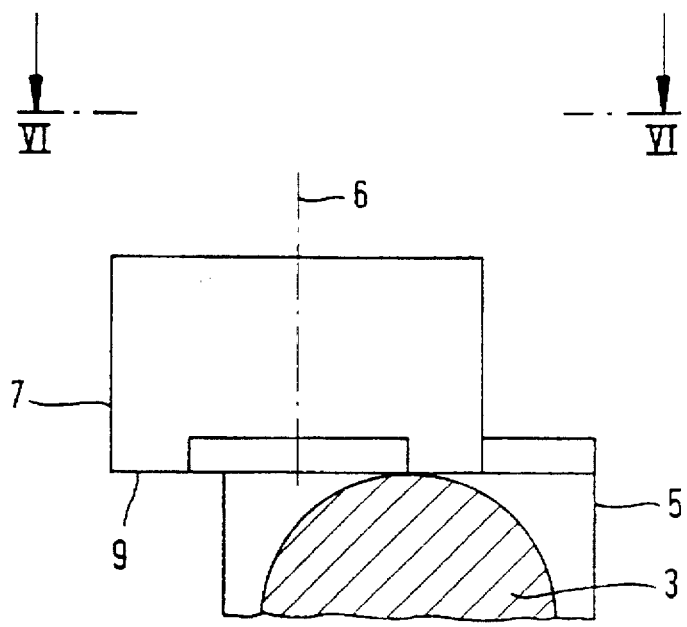
FIG. 7 is a partly sectional view taken along the line VII—VII in FIG. 6 and viewed in the direction of the arrows.

The geometry of the milling according to the invention of the suction side 3 emerges from FIGS. 6 and 7. FIG. 6 showing a view of a configuration consisting of the milling cutter 7 and workpiece 5 and perpendicular to the main axis 1, and FIG. 7 being a view of the same arrangement parallel to the main axis 1, as indicated by the line VII—VII in FIG. 6. The relation between FIGS. 6 and 7 is also indicated in FIG. 7 by the line VI—VI which reproduces the view of the configuration shown in FIG. 6. According to the figures, the suction side 3 of the blade profile 2 is milled out of the workpiece 5 by means of a cylindrical milling cutter 7 rotating about the associated axis of rotation 6. Shaping takes place essentially by means of cutting edges 9 which are oriented approximately perpendicularly to the axis of rotation 6 and of which four are shown. As a result of the rotation of the milling cutter 7, the cutting edges 9 define an annular endface 8 with an outer edge 11 and an inner edge 12. The outer edge 11 is determined by the ends of the cutting edges 9 facing away from the axis of rotation 6 and the inner edge 12 by the ends of the cutting edges facing the axis of rotation 6. To obtain a smooth face, the end face 8 of the milling cutter 7 is to be oriented relative to the suction side 3 to be produced, in such a way that it touches the suction side 3 tangentially at a contact line 10. In this way, it is possible, over the width of the contact line 10, to prevent the milling process from leaving projections behind on the suction side 3. To avoid this, it is also important that the contact line 10 runs completely within the endface 8 and not be interrupted by the inner edge 12. The contact line 10 is defined as a secant connecting two points on the outer edge 11 and extending completely within the endface defined between the outer edge 11 and the inner edge 12. In this case, the possible milling width would be reduced by half, since the desired milling result is achieved only over respective continuous portions of the contact line 10. In order to make the contact line 10 as wide as possible, it is advantageous to place it in such a way that it touches the inner edge 12 of the endface 8 approximately tangentially (FIG. 6). The contact line 10 thus becomes especially wide, thus resulting directly in an especially wide smooth milling track on the suction side 3. However, since the benefits of the milling process shown cannot be implemented on the convex pressure side 4, it is, in any case, necessary to throw off the milling cutter 7 after a complete traverse of the suction side 3, so that, to achieve as wide milling tracks as possible, it is recommended to guide the milling cutter over the suction side 3 approximately perpendicularly to the main axis 1. It may be noted in conclusion, that, for the sake of clarity, the suction side 3 has been represented as circular-cylindrical in FIGS. 6 and 7 however, this is not detrimental to the possibility of applying the teaching according to the invention to a suction side 3 of more complicated shape, such as emerges particularly from FIG. 5.

Figure 8:
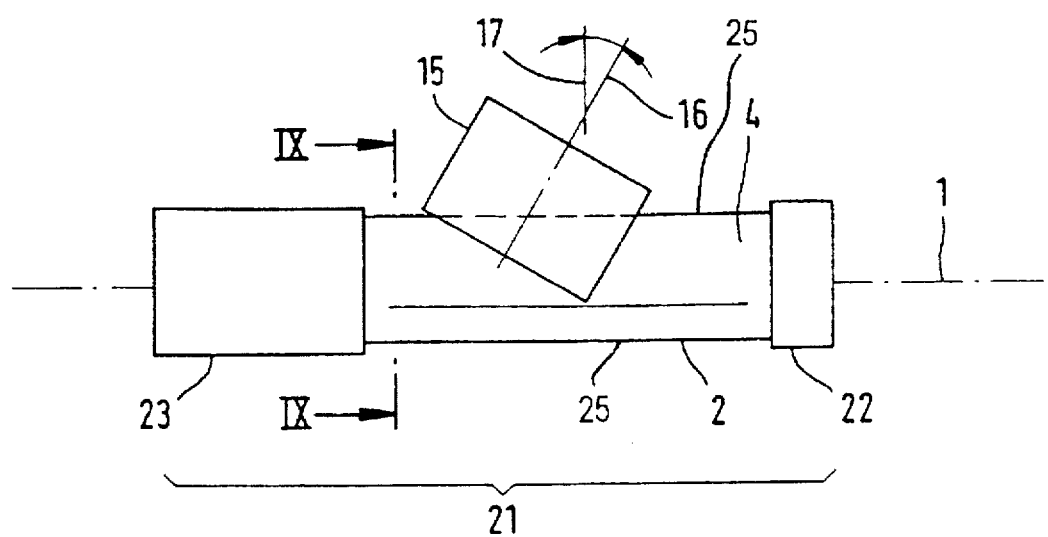
FIG. 8 is a diagrammatic view of a turbine blade with a milling cutter positioned at ready for milling the pressure side.
Figure 9:
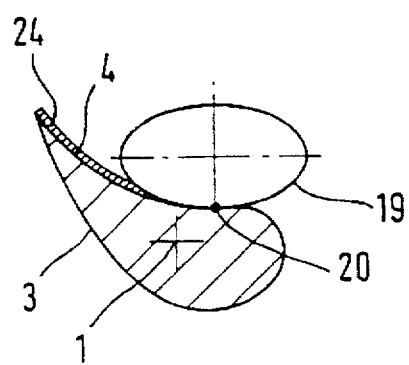
FIG. 9 is a cross-sectional view taken along the line IX—IX in FIG. 8.
Figure 10:
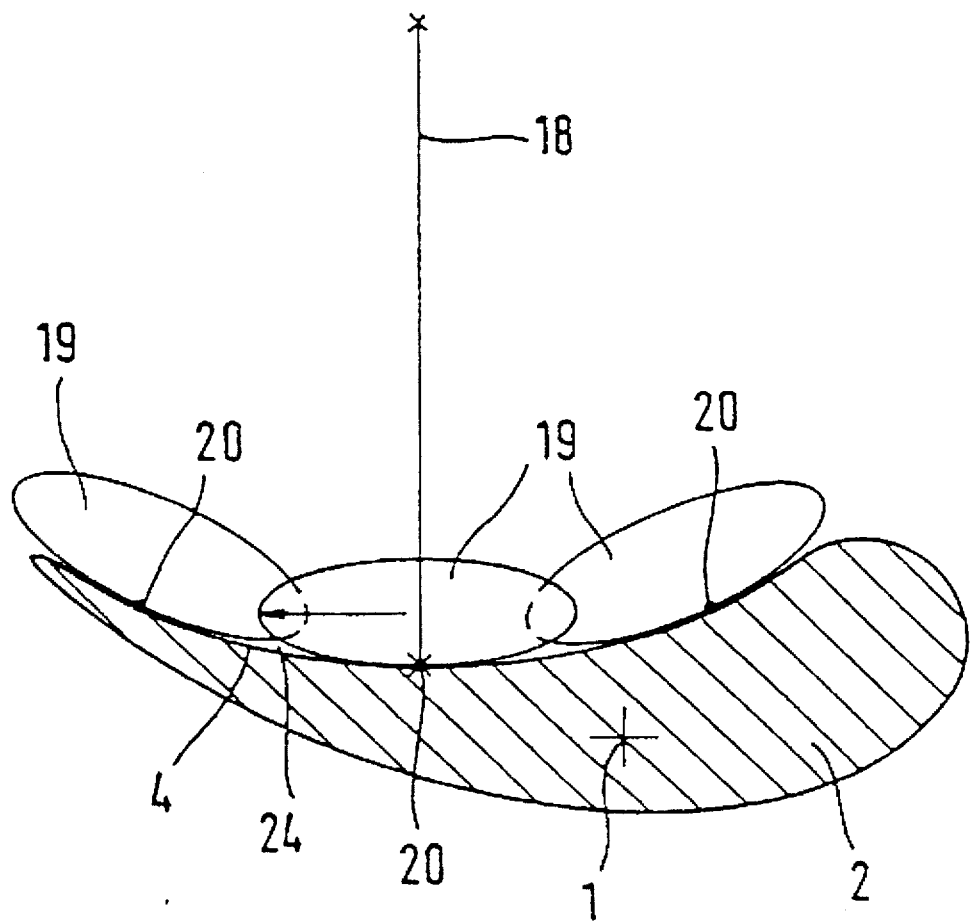
FIG. 10 is a section through a turbine blade with a sketch illustration regarding the milling of how the pressure side with a plurality of milling tracks.

The milling according to the invention of the concave pressure side 4 of the turbine-blade profile 2 is evident from FIGS. 8, 9 and 10. FIG. 8 shows a view of the configuration consisting of the turbine-blade profile 2 and of the milling cutter 15 used for milling the pressure side 4, perpendicularly to the main axis 1, FIG. 9 shows a section through the turbine-blade profile 2, evident from FIG. 8, perpendicular to the main axis 1, as indicated by the line IX—IX in FIG. 8, and FIG. 10 shows a turbine-blade profile 2, on the pressure side 4 of which a plurality of milling tracks 19 are indicated. Reference is first made to FIGS. 8 and 9. FIG. 8 not only shows the turbine-blade profile 2, but indicates the entire turbine blade 21 together with the head part 22 and root part 23. It also becomes clear from FIG. 8 that the turbine-blade profile 2 is straight in relation to the main axis 1. To mill the pressure side 4, the milling cutter 15, which rotates about the axis of rotation 16 and which has, perpendicularly to the axis of rotation 16, a clearly smaller radius than the radius of curvature of the pressure side 4 recognizable from FIG. 9, is arranged in such a way that the axis of rotation 16 forms an acute angle with a plane 17 (indicated as a line in FIG. 8) running perpendicularly to the main axis 1, and is guided approximately along the main axis 1 over the pressure side 4 to be milled. In this way, it generates milling tracks 19 which have elliptic cross-sections perpendicularly to the main axis 1, the major semi-axes of the ellipses describing these cross-sections being approximately parallel to the pressure side 4 along the contact line 20 on which the milling tracks 19 coincide with the pressure side 4. Furthermore, the radius of the milling cutter 15 and the angle between its axis of rotation 16 and the plane 17 are advantageously selected so that the radius of curvature of the elliptic milling track 19 on the contact line 20 corresponds to the radius of curvature of the pressure side 4 on the contact line 20. This ensures that the projections 24 which persist are minimal, and moreover the entire pressure side 4 can be covered completely by relatively few milling tracks 19. Details of this emerge from FIG. 10 which is likewise a cross-section through a turbine-blade profile 2 perpendicular to the main axis 1. In the case illustrated, the pressure side 4 is circular-cylindrical, so that, at each point of the pressure side 4, the associated radius of curvature is equal to a single value, namely the radius 18 of the pressure side 4 which consequently corresponds to its minimum radius of curvature. As indicated in FIG. 10, the pressure side 4 is to be milled essentially completely, in that three milling tracks 19, indicated by ellipses partially overlapping one another, are placed over the pressure side 4. As already mentioned, each milling track 19, on the contact line 20 on which it corresponds to the pressure side 4, must have the same radius of curvature as the pressure side 4 itself (on this point, FIG. 10 is to be seen as a diagrammatic representation for which no claim is made that this requirement is satisfied). The projections 24 persisting on the pressure side 4 between the milling tracks 19 are, in fact, very small, and in actual fact it is possible, by suitable dimensioning of the milling cutter 15 and calculation of the number of milling tracks 19, which can nevertheless remain very small, to achieve projections 24 which can be eliminated by simple grinding or lapping processes which, as a rule, are necessary in any case for final machining.

For the sake of simplicity and clarity, the invention has been explained by means of the drawing in terms of the production of a turbine-blade profile straight along the main axis, that is to say a turbine blade profile for a drum blade. This explanation does not, of course, entail any restriction with regard to the scope of the appended claims which, of course, also relate to other types of turbine-blade profiles. Particularly with regard to turbine-blade profiles comprising sets of straight lines 25 as shown in FIGS. 6 and 8, a modification of the explanation given is unnecessary, and it must merely be stated that the contact line, which describes the arrangement of the endface of the milling cutter on the suction side or of the milling track on the pressure side of the turbine-blade profile to be produced, should coincide with one of the straight lines which form the turbine-blade profile. Further turbine blade profiles, attention may be drawn once again to the statements made above for the approximation of any turbine-blade profile with surfaces which are formed from straight lines.

In summary, the invention is conducive to the especially efficient milling of turbine-blade profiles; the invention is particularly suitable for execution on four-axis or five-axis, digitally controlled milling machines.

We claim:

1. A process for milling a turbine-blade profile from a workpiece, the turbine-blade profile extending along a main axis and having a convex suction side surface and a concave pressure side surface, the process which comprises:
providing a milling cutter having a planar, circular endface defined by a rotating configuration with at least one cutting edge disposed in the endface;
milling a suction side surface with the milling cutter rotating about a given axis of rotation;
moving the milling cutter and the workpiece relative to one another during the milling step substantially perpendicularly to the main axis; and
orienting the endface tangentially to the suction side surface to be milled during the moving step and contacting the suction side surface with the milling cutter at a contact line forming a given angle with the main axis.

2. The process according to claim 1, which comprises defining the given angle between the contact line and the main axis as an acute angle.

3. The process according to claim 1, which comprises defining the given angle between the contact line and the main axis as zero.

4. The process according to claim 1, which comprises defining the endface of the milling cutter between a radially outer edge and an inner edge, and defining the contact line as a secant line extending between two points on the outer edge and lying completely within the endface.

5. The process according to claim 4, which comprises defining the contact line approximately tangentially to the inner edge.

6. The process according to claim 1, wherein the turbine blade profile has convex transition zones between the suction side surface and the pressure side surface, and the process further comprises milling the transition zones together with the suction side surface.

7. The process according to claim 1, wherein the suction side surface is formed from a set of straight lines, and the process comprises defining the contact line to always lie on one of the straight lines.

8. The process according to claim 7, which comprises defining the contact line at an acute angle relative to the main axis.

9. The process according to claim 7, which comprises defining all of the straight lines parallel to the main axis.

10. A process for milling a turbine-blade profile, from a workpiece, the turbine-blade profile extending along a main axis and having a convex suction side surface and a concave pressure side surface, the process which comprises:
milling a pressure side surface with a milling cutter rotating about an axis of rotation, whereby the axis of rotation intersects a plane defined perpendicularly to the main axis at an acute angle;
moving the workpiece and the milling cutter relative to one another at a given angle relative to the main axis during the milling step; and
defining a plurality of mutually overlapping milling tracks on the pressure side surface, each of the milling tracks having an elliptic cross-section being perpendicular to the main axis and extending along a contact line, and milling the pressure side surface with the milling cutter along the milling tracks.

11. The process according to claim 10, wherein the pressure side surface has a minimum radius of curvature, and the method further comprises providing the milling cutter for milling the pressure side surface with a radius smaller than the minimum radius of curvature.

12. The process according to claim 11, which comprises, in the milling step, defining at least one of the milling tracks on the pressure side surface to have a radius of curvature substantially equal to the radius of curvature of the pressure side surface on the contact line.

13. The process according to claim 12, which comprises defining at most five milling tracks.

14. The process according to claim 10, which comprises defining the pressure side surface with a set of straight lines, each oriented at a given angle relative to the main axis, and moving the milling cutter along one of the straight lines.

15. The process according to claim 14, wherein the given angle is zero and all of the straight lines are oriented parallel to the main axis.

16. The process according to claim 14, wherein the given angle is an acute angle.

17. The process according to claim 10, which comprises defining the given angle between the contact line and the main axis as an acute angle.

18. The process according to claim 10, which comprises defining the given angle between the contact line and the main axis as zero.

* * * * *